(12) United States Patent
Lee

(10) Patent No.: US 8,693,631 B2
(45) Date of Patent: Apr. 8, 2014

(54) CRASER DEVICE, IMAGING SYSTEM AND METHOD

(75) Inventor: Susanne Madeline Lee, Cohoes, NY (US)

(73) Assignee: General Electric Company, Niskayuna, NY (US)

( * ) Notice: Subject to any disclaimer, the term of this patent is extended or adjusted under 35 U.S.C. 154(b) by 379 days.

(21) Appl. No.: 13/220,466

(22) Filed: Aug. 29, 2011

(65) Prior Publication Data

US 2013/0051515 A1    Feb. 28, 2013

(51) Int. Cl.
 *G01T 1/36* (2006.01)
(52) U.S. Cl.
 USPC .............................................. 378/82; 378/62
(58) Field of Classification Search
 USPC ........................... 378/4, 62, 70, 82, 119, 120
 See application file for complete search history.

(56) References Cited

U.S. PATENT DOCUMENTS

| | | | |
|---|---|---|---|
| 7,366,374 B1 | 4/2008 | Lee et al. | |
| 7,412,131 B2 | 8/2008 | Lee et al. | |
| 7,442,566 B2 | 10/2008 | Ohmuro et al. | |
| 7,508,911 B1 | 3/2009 | Lee et al. | |
| 2007/0152171 A1 | 7/2007 | Goldstein et al. | |
| 2008/0159707 A1 | 7/2008 | Lee et al. | |
| 2009/0010605 A1 | 1/2009 | Lee et al. | |
| 2009/0041198 A1 | 2/2009 | Price et al. | |
| 2009/0147922 A1 | 6/2009 | Hopkins et al. | |
| 2010/0296171 A1 | 11/2010 | Lee et al. | |
| 2011/0206187 A1 | 8/2011 | Lee et al. | |
| 2012/0051499 A1 | 3/2012 | Lee et al. | |
| 2012/0163547 A1 | 6/2012 | Lee et al. | |

OTHER PUBLICATIONS

S.M. Lee, "Multilayer Total Internal Reflection Optic Devices and Methods of Making and Using the Same," U.S. Appl. No. 13/194,346, filed Jul. 29, 2011.

*Primary Examiner* — Jurie Yun
(74) *Attorney, Agent, or Firm* — Jenifer Haeckl

(57) ABSTRACT

A craser device, imaging system utilizing a craser device, and a method of imaging. The craser device includes a gain medium with excited gain medium atoms that emit x-ray and/or gamma-ray photons, a transmission medium abutting the gain medium, and a reflecting mirror comprising one or more lower refractive index layers and abutting the transmission medium. The transmission medium has a higher refractive index than the gain medium and at least one of the materials in the reflecting mirror. The x-ray and/or gamma-ray photons are confined to the transmission medium via total internal reflection and interact multiple times with the excited gain medium atoms through evanescent waves producing amplified stimulated emission leading to formation of a high intensity incoherent or coherent x-ray and/or gamma-ray beam.

34 Claims, 5 Drawing Sheets

CRASER DEVICE, IMAGING SYSTEM AND METHOD

This invention was made with Government support under contract number HR001110C0045 awarded by the Defense Advanced Research Projects Agency. The Government has certain rights in the invention.

BACKGROUND

The present disclosure relates to a laser, imaging device and method. More particularly, the present disclosure relates to a laser, imaging device and method utilizing x-ray energy emission from the laser.

It is known to use x-ray photons to create images of interior portions of an object, such as luggage, industrial parts, a human or animal. Computed tomography and laminography are examples of imaging techniques that use broad band ionizing radiation.

There are several disadvantages in medical imaging to using broad band ionizing radiation or photons at many different energy levels. Very high energy levels can decrease the signal-to-noise level by increasing the noise in the images. It has been alleged that very low energy levels are absorbed in the bodies of patients, which can lead to enhanced risk of radiation-based problems such as cancer. To address this problem, some medical imagers utilize filters to filter out the lowest energy photons. These filters do filter out the lower energies, but they also reduce the number of higher energy photons. Thus, the result is medical imagers that lack the needed intensity to form clear images.

Some medical imagers are termed multi-energy imagers, which image at two or more energies. By utilizing two energies, compositionally different materials in an image are more easily distinguished than when imaged with a single energy. Current multi-energy imaging systems form the images from different energy regimes by operating the x-ray source tube at different voltages, e.g., 80 kVp and 140 kVp. Then, in the simplest analysis, the images can be subtracted to produce an image formed predominantly from the higher energies, from 80 to 140 keV, but some energies below 80 keV are still present. Ideally comparing an image formed solely by 80 to 140 keV photons to one produced by energies below 80 keV would enable clear distinction between materials of different composition. However, in practice, energies below 80 keV are typically present in the "high-energy" image introducing significant difficulty and complexity into the resulting image analysis.

Some medical imagers are termed 4D imagers. Such imagers are often used to create cardiac images so that medical personnel can ascertain whether any heart-related issues or abnormalities, for example obstructed, or clogged, arteries, exist in a patient. The way these imagers work is the patient is placed within a tube that weighs many hundreds of pounds. Once the patient is properly positioned, the tube is rotated at a rapid angular velocity. One issue with such imaging is the short time required for a sharp image of the heart at rest—i.e., between beats. A healthy adult person may have a resting heart rate of 60 to 80 beats per minute (bpm). The heart rate accommodates a number of variables such as age, weight, height, and physical fitness. Less fit persons, and frankly the ones more likely to be utilizing such imagers, have a resting heart rate far in excess of 60 bpm, sometimes as high as 150 bpm or more. It has been found that due to the weight of the x-ray source, spinning the source at the required high speeds is quite difficult. Thus, obtaining high quality images of a resting heart is quite difficult in a large percentage of the population.

Certain therapeutic techniques in use utilize ionizing radiation to address a health issue. For example, to remediate prostate cancer, one therapeutic technique includes placing radioactive beads in the prostate to destroy the tumor. One problem with this technique is that the radiation from these radioactive beads is isotropic, resulting in irradiation of other areas, for example femurs, possibly leading to an enhanced risk of leukemia.

Other disadvantages occur in imaging techniques that use ionizing radiation outside the medical field. For example, current inspection of cargo typically includes imaging the cargo contents within the container itself. This is usually performed by placing the cargo container on a truck and directing the truck to a certain location between an x-ray source and a detector.

Certain current x-ray source configurations transmit diverging x-rays. Nonetheless, to be able to image an entire cargo container during a single pass, the x-ray source must be at a great distance from the cargo container, on the order of one-half a mile or so. Since the x rays that eventually strike the cargo container have diverged so much by the time they reach the cargo container, the x-ray flux density is extremely low, necessitating long exposure times, on the order of 20 minutes or longer. With between 100 and 1000 cargo containers offloaded daily at ports, such long imaging times are impractical for every container. Forming a smaller beam with 100 to 1000 times or greater flux density could enable scanned inspection of every container.

Imaging techniques used to image printed circuit boards (PCB) typically lack the requisite intensity to address PCBs with ever increasing layers. Further, imaging techniques used in inspection of industrial parts also suffers from a lack of needed intensity. Such imagers are used on an almost continuous basis and utilize x-ray tubes that are less powerful but with a greater service life. The lack of needed intensity results in a failure to see intricate details, such as cracks in turbine blades or inability to inspect every part, for example.

X-ray imaging techniques are desired to inspect, for example, subsea risers used to bring oil and/or natural gas up to the surface from undersea wells. Inspection is sometimes used to ascertain whether any cracks are forming in the risers. However, present x-ray tubes do not provide sufficient x-ray flux to make such imaging inspection practical. Industrial x-ray sources with sufficient energy, on the order of 500 kVp, and x-ray flux, weigh several hundred pounds and produce so little x-ray flux that the data acquisition time for imaging is on the order of tens of hours or longer. During that time, risers tend to move along with the wave movement offshore, inhibiting formation of clear images of the subsea risers.

X-rays have also been contemplated for use in providing and disrupting communications. For example, a collimated high-energy, high-intensity x-ray beam could be used to send information to aircraft miles above the earth with almost no loss of signal, whereas lower energy photons are scattered by particles in the atmosphere. However, as noted previously, no known portable x-ray sources provide the kind of intensity and collimation to make such a use practical.

Some x-ray sources that could provide the intensity and collimation but not at the high energies needed for some of the applications previously discussed are called x-ray lasers. Currently, the only type of x-ray laser that is intense enough is a free-electron laser, most of which require synchrotrons. Such lasers are impractical because the synchrotrons are huge (on the order of 3.5 kilometers in diameter) and cannot be moved to the location of the sample. Recent advances in miniaturizing synchrotrons have led to free-electron lasers that are on the size of two large rooms and produce the desired collimated x-ray beam with just barely sufficient intensity. However, demonstrated energies are less than needed for many applications. Furthermore, these miniaturized synchrotron x-ray lasers require a very powerful visible laser (approximately one gigawatt of power) to excite the gain medium to start the x-ray emission process. So, while technically these known miniaturized synchrotron x-ray lasers may be mobile, finding a one gigawatt power source is difficult. Even with such a power source, the imaging energy level is only about 20 keV.

Additionally, synchrotron and collisional x-ray lasers are single pass lasers, which means the path over which the photons travel and undergo stimulated emission must be very long in order to produce high intensity.

Traditional x-ray imaging provides a map of the absorptive properties of a sample. Visualizing the initial stages of carcinomas and other histological structures can be difficult due to minimal distinction—a few percent—between their absorptive properties and those of surrounding tissue. However, it has been demonstrated that the refractive index changes can be significant enough to enable visualization of some histological structures. X-ray phase-contrast imaging creates images based on these refractive index differences. This type of imaging relies on a spatially coherent x-ray beam, such as can be provided by an x-ray laser, to traverse a sample containing regions of differing refractive indices and be refracted by these areas. Upon refraction, these x rays undergo a phase shift and lose their initial coherence. When these "incoherent" photons interact with un-refracted or direct x rays, constructive and destructive interference patterns are produced that are reconstructed into very high-contrast images of boundaries within the sample. One problem with phase contrast microscopy is the much higher intensity of the direct x-ray beam in comparison to the refracted beam causing a very low signal to noise ratio in the interference pattern.

In dark-field microscopy the direct beam can be suppressed, improving the contrast of an image by using only the scattered x rays. This type of imaging, like phase contrast imaging, requires a coherent incident x-ray beam, such as can be provided by an x-ray laser. The major issues with both types of imaging is the long exposure times required due to the low intensity laboratory (non-synchrotron based) x-ray sources currently available.

Holographic x-ray images with nanometer-scale resolution can be made of objects measured in microns in times as brief as femtoseconds. X-ray holography could be the enabling tool for developing nanoscience and nanotechnology. However, this technique depends on the wave-like properties of the x rays and requires the use of x-ray lasers, of which only synchrotron-based ones currently exist. Thus both the creation and viewing of x-ray holograms can only be performed at synchrotrons, which makes this technique impractical for use in enabling, for example, the development of many nanotechnologies.

What is desired is an x-ray laser that addresses one or more of the aforementioned disadvantages.

SUMMARY

An embodiment provides a craser device that includes a gain medium with excited gain medium atoms that emit x-ray photons, a transmission medium proximate to the gain medium and having a higher refractive index than the gain medium, and a reflecting mirror comprising one or more lower refractive index layers and abutting the transmission medium. The x-ray photons are confined to the transmission medium via total internal reflection and the x-ray photons interact with the excited gain medium atoms through evanescent waves producing amplified stimulated emission, wherein the amplified stimulated emission forms a high intensity incoherent or coherent x-ray beam.

An embodiment provides an imaging system that includes a craser emitting device and a detector for detecting images created with a high intensity incoherent or coherent x-ray beam. The craser emitting device includes an internally excited or externally excited gain medium for forming x-ray photons, a transmission medium proximate to the gain medium, and a reflecting mirror comprising one or more graded lower refractive index layers, the reflecting mirror configured to abut the transmission medium. The x-ray photons interact within the transmission medium via total internal reflection and interact with the gain medium atoms providing amplified stimulated emission and formation of the high intensity incoherent or coherent x-ray beam.

An embodiment provides a method for imaging an object. The method includes forming a craser beam, directing the craser beam at the object, and detecting an image of the object. The craser beam is formed by exciting gain medium atoms in a gain medium, emitting at least one x-ray or gamma-ray photon of at least one energy by the excited gain medium atoms to a transmission medium, quantum confinement of the at least one photon of at least one energy to the transmission medium by total internal reflection from a reflecting mirror abutting the transmission medium, and amplified stimulated emission of the at least one photon of at least one energy when the quantum confined photons interact with the excited gain medium atoms via the photon evanescent waves.

These and other features, aspects and advantages of the invention may be further understood and/or illustrated when the following detailed description is considered along with the attached drawings.

DETAILED DESCRIPTION

The present specification provides certain definitions and methods to better define the embodiments and aspects of the invention and to guide those of ordinary skill in the art in the practice of its fabrication. Provision, or lack of the provision, of a definition for a particular term or phrase is not meant to imply any particular importance, or lack thereof; rather, and unless otherwise noted, terms are to be understood according to conventional usage by those of ordinary skill in the relevant art.

Unless defined otherwise, technical and scientific terms used herein have the same meaning as is commonly understood by one skilled in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable.

The modifier "about" used in connection with a quantity is inclusive of the stated value and has the meaning dictated by the context (e.g., includes the degree of error associated with measurement of the particular quantity). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Figure 1:
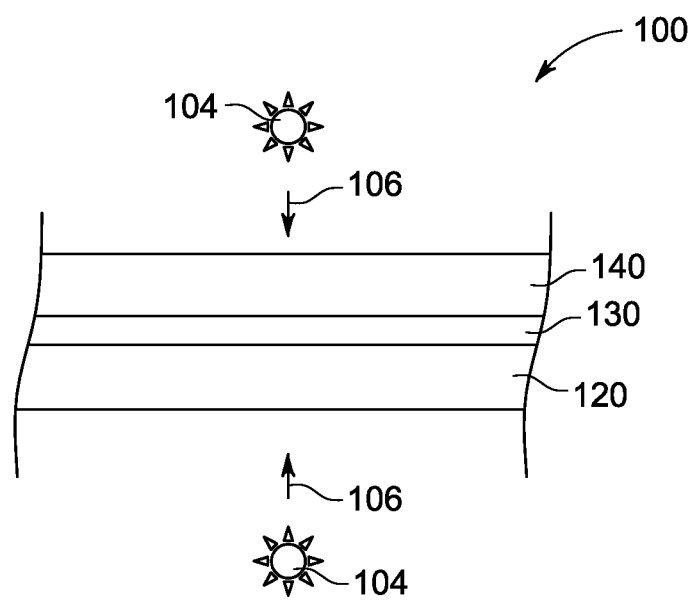
FIG. 1 is a schematic view partially illustrating a craser device in accordance with an embodiment.
Figure 8:
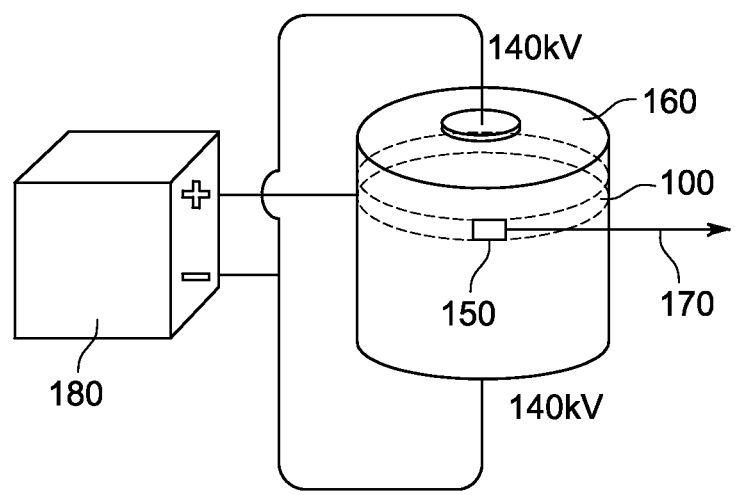
FIG. 8 is a schematic view of a craser system in accordance with an embodiment.

As illustrated in FIG. 1, there is shown a craser device 100 that is part of a craser system 160 (FIG. 8). The term "CRASER" stands for Critical angle Radiation Amplification by Stimulated Emission of Radiation. A craser device is a device that produces a high intensity x-ray beam by confining to a transmission medium via total internal reflection fluorescence or natural photon emission from a gain medium and amplifying that confined beam through stimulated emission of the gain medium via the confined photons' evanescent waves. By shaping the gain, transmission, and reflecting media into a ring resonator, the craser beam can be made temporally and spatially coherent, as in laser diodes employing ring resonators today. Thus the craser can be a compact x-ray laser.

In FIG. 1, there is shown a craser device 100 a source of energy 104, a gain medium 120, a transmission medium 130, and a reflecting mirror 140. The source of energy 104 is required to excite gain medium atoms into excited states. Alternatively, the gain medium could be naturally excited, as in the case of radioactive materials. Examples of suitable sources of energy 104 include a photon beam, and/or particle beams such as an electron beam, a proton beam, a neutron beam, and an ion beam. An example of a radioactive material that could be used for the gain medium is uranium, which emits gamma rays at approximately 1.76 MeV.

For a source of energy 104 that is an electron beam, the electron beam may be formed by one or more cold cathode field emitter devices. In these devices, an electric field is applied across the emitter to extract the electrons. In conventional thermionic electron emitters used in conventional x-ray sources, a filament is operated at very high temperatures and electrons "boil off", or escape, the filament due to their high energy from the high heat.

Of importance is that the gain medium 120 is formed of a lower refractive index as compared to the transmission medium 130. The gain medium 120 may be formed from a high Z material, i.e., materials having a high atomic number. Further, the gain medium 120 may be formed of one or more radioactive materials, or it may be formed of one or more radioactive materials and one or more non-radioactive materials. For the embodiments of the gain medium 120 that include radioactive elements, the excitation of the gain medium atoms is accomplished by nuclear energy transitions, thus obviating the requirement of an external excitation source 104. Suitable materials from which the gain medium 120 may be formed include molybdenum, tin, europium, gadolinium, erbium, ytterbium, osmium, tungsten, gold, cobalt, and uranium. The real part of the refractive index for a gain medium 120 formed of erbium is 0.99999985 at about 100 keV.

The gain medium 120 may be formed of multiple materials, wherein one or more of those materials is radioactive. The radioactive materials may emit gamma rays or electrons that may then excite the non-radioactive gain media into emitting fluorescent photons, which can then interact with the rest of the craser device to form a high-intensity photon beam. Alternatively, the radioactive materials may emit neutrons or protons that upon bombarding the non-radioactive gain media materials can turn them into radioactive materials. These newly created radioactive materials can then emit gamma rays that are amplified by the rest of the craser device. A reason for having such a two stage process of one radioactive material creating another may be due to the emission energies desired. Some of the energies emitted by non-radioactive materials once they become radioactive are not possible to obtain any other way.

Figure 5:
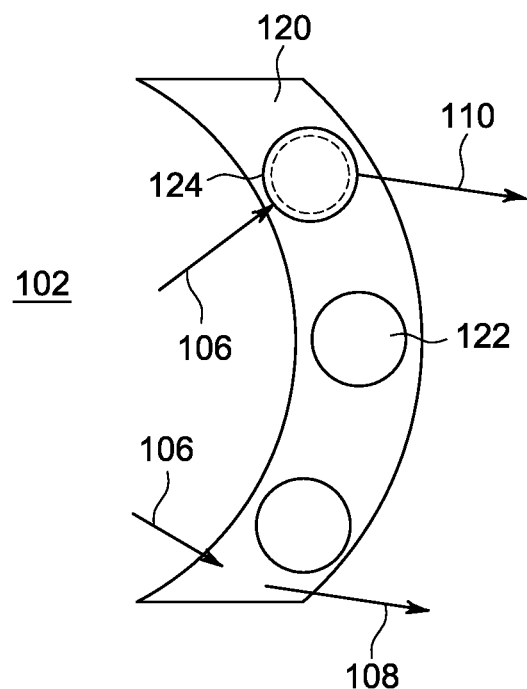
FIG. 5 is a partial view of the gain medium of FIG. 4 in accordance with an embodiment.

As the photons and/or particle beams 106 from the energy source 104 enter the gain medium 120, they can either strike a gain medium atom 122 (FIG. 5) or not. A photon or particle 106 that does not strike a gain medium atom is slowed down by the gain medium atoms 120 resulting in emission of Bremsstrahlung photons 108. Striking the inner shell electrons of a gain medium atom 122 can cause ejection of those electrons, resulting in an increase in the energy level of the atom. Such excited gain medium atoms are represented generally with numeral 124. When the excited gain medium atoms return to their ground state energy level, an energy equivalent to that needed to eject the inner shell electron is released in the form of K-, L-, or M-fluorescent photons 110. The letter K, L, or M assigned to the resulting fluorescent photons is determined by the electron shell, from which the original electron was ejected, with the K shell being the closest to the atomic nucleus. Alternatively, the energy level of the atom can be increased with respect to other atoms in the material if that atom is radioactive. Then, when that excited gain medium atom decays, gamma rays can be released, instead of the K, L, or M fluorescent photons.

Depending on the atom, the K-fluorescent photons can have photon energy levels in a range of from about 30 keV to less than about 120 keV, while L-fluorescent photons can have photon energy levels in the range of about 10 keV, and M-fluorescent photons can have even lower photon energy levels. The gamma rays results from nuclear decay can have energies above 1 MeV. Since each of the photon energy levels can be amplified in the craser 160, the craser has the potential to emit at these discrete, non-overlapping energies, enabling near monochromatic multi-energy imaging for better distinction between materials of similar x-ray absorption coefficients.

Figure 4:
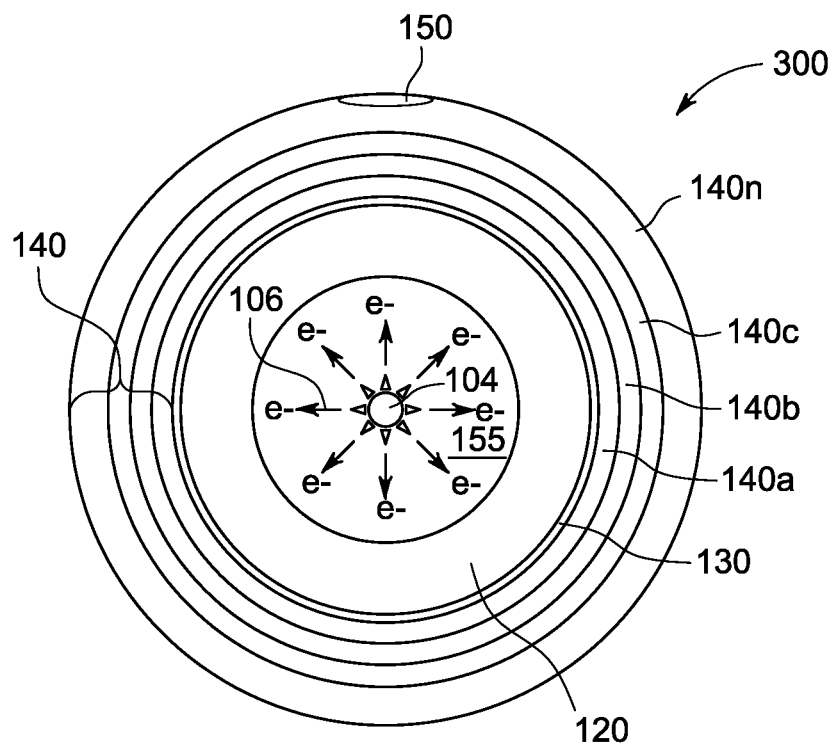
FIG. 4 is a schematic view of a craser device in accordance with an embodiment.

Some of the emitted photons 110 from the excited gain medium atoms proceed into the transmission medium 130 (FIG. 4). As compared to the gain medium 120, the transmission medium 130 has a relatively higher refractive index than that of the surrounding materials. The transmission medium 130 also is of a much smaller width than the layers on either side of it. This smaller width and higher refractive index quantum confines the photons to the transmission layer and enables their evanescent waves to extend sufficiently into the lower refractive index layers for significant stimulated emission in those layers to occur. The transmission medium 130 may be formed of a low Z (atomic number) material to minimize x-ray absorption in the transmission medium 130. Suitable materials for forming the transmission medium 130 include carbon, boron (real part of the refractive index is 0.99999993 at about 100 keV), lithium, beryllium, or a low Z polymer, such as poly(methyl methacrylate) (PMMA).

Figure 2:
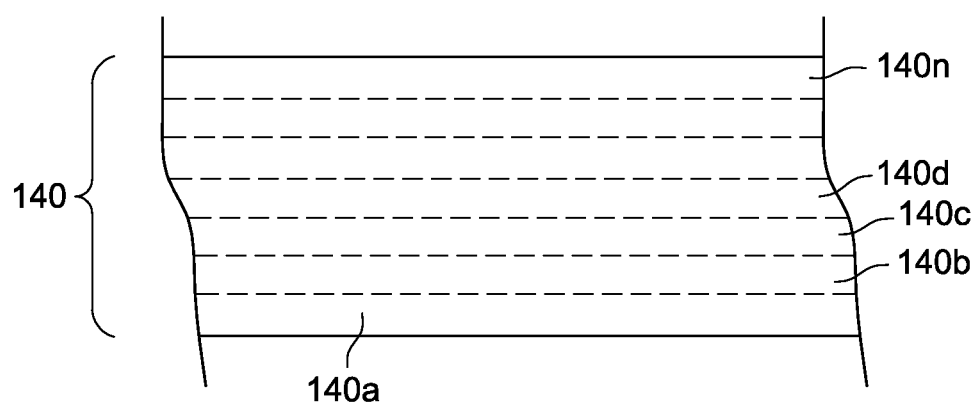
FIG. 2 is a schematic view illustrating a plurality of layers of the reflecting mirror of FIG. 1 in accordance with an embodiment.

The emitted photons 110 continue through the transmission medium 130 to a reflecting minor 140. The reflecting minor 140 includes one or more materials having a lower refractive index than the transmission medium 130. The reflecting mirror 140 may be comprised of a single layer of lower refractive index material. Alternatively, and with specific attention to FIG. 2, the reflecting mirror 140 may be comprised of numerous layers of material 140a-140n. The layers of material 140a-140n may include different material compositions such that each successive layer—for example, 140a—has a relatively higher refractive index than the one above it—for example, 140b. Alternatively, the layers of material 140a-140n may be graded such that relatively higher refractive index materials are interleaved between relatively lower refractive index materials. It should be appreciated that any number of layers 140n may be utilized in the craser device 100.

The lower refractive index materials within the reflecting minor 140 may be comprised of materials having the same or different composition than the gain medium material. The photons or particle beams that excite the gain medium, if they have enough energy, can also penetrate through to the lower refractive index materials in the reflecting material and excite the lower refractive index materials. X rays confined to the transmission medium 130 will have evanescent waves that penetrate into the reflecting minor, just as these waves also penetrate the gain medium 120. When those waves encounter excited low refractive index reflecting minor materials, stimulated emission can occur, similar to what happens in the gain medium 120. These additional photons will travel towards the transmission layer and be confined within it, once the photons enter that layer. The intensity of the photon beam confined to the transmission layer will thereby be increased.

Figure 6:
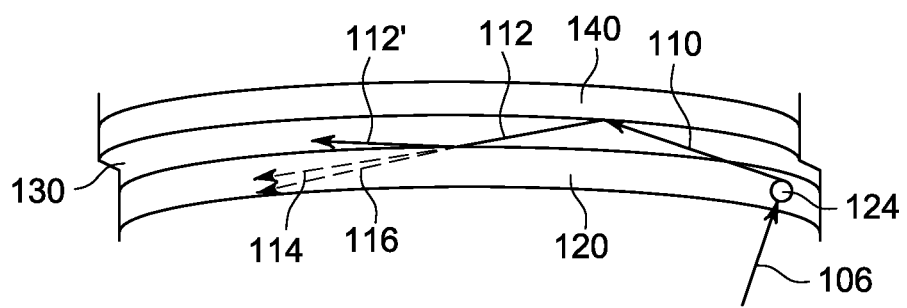
FIG. 6 is a partial view of the craser device of FIG. 4 showing the excitation of gain medium atoms in accordance with an embodiment.

Some of the emitted photons 110 will travel through the transmission medium and reflect via total internal reflection from the multilayers of the reflecting mirror 140 back into the transmission medium 130. These reflected photons are shown in FIG. 6 as photons 112. This sort of reflection will happen when the photons 110 make a shallow enough angle with the reflecting minor to satisfy the critical angle condition for total internal reflection, as shown in FIG. 6.

Figure 7:
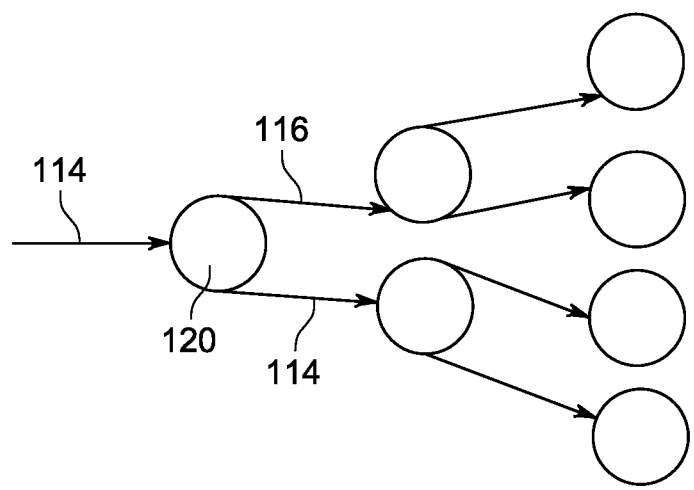
FIG. 7 is a schematic view of the excitation of gain medium atoms in accordance with an embodiment.

As the reflected photons 112 reach the interface between the transmission medium 130 and the gain medium 112, a real portion of the reflected photon wave functions 112' is reflected back into the transmission medium 130, while an imaginary portion of the reflected photons wave functions 114, also called an evanescent wave, penetrates the gain medium 120. When the evanescent wave strikes an excited gain medium atom 124, stimulated emission of a photon 116 can occur that is coherent with the initial photon 114. The coherent waves 114, 116 then can each produce stimulated emission from two more excited gain medium atoms 124 to create four coherent photon waves (FIG. 7). This amplification process can continue throughout the craser 100 leading to an intense coherent x-ray beam.

The reflecting minor 140 can have an almost near perfect (100%) reflectivity. Reflectivity levels of 99.99 percent at an energy level of 60 keV have been demonstrated experimentally. Thus, at every reflection, the energy level of the electromagnetic wave drops by only 0.01 percent.

Figure 3:
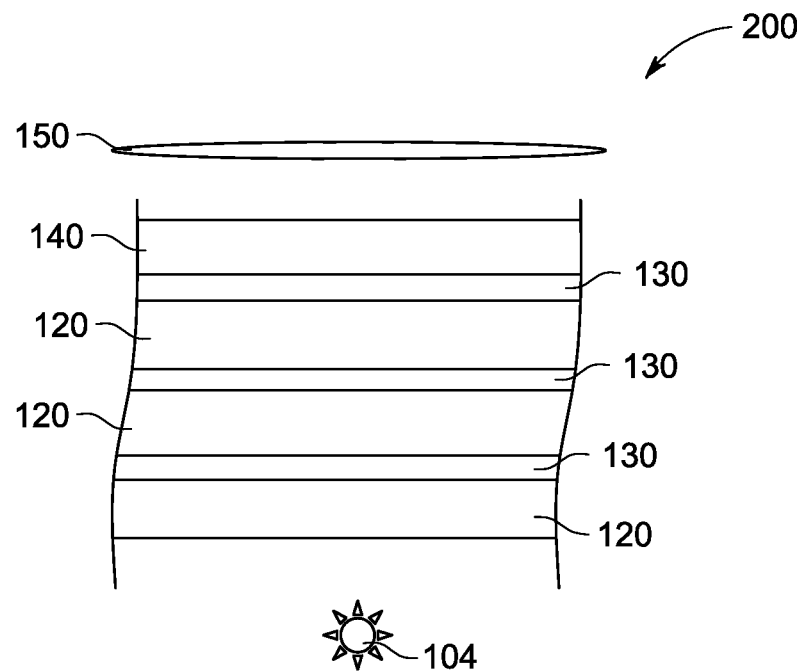
FIG. 3 is a schematic view partially illustrating a craser device in accordance with an embodiment.

A beam of energy 170 is allowed to escape the craser device 100 through a window 150 formed at an edge of the craser device 100 (FIGS. 3 and 8). The window 150 may simply be etched into some of the layers forming the craser device 100 or it may include a high refractive index material formed in place of a portion of the craser device 100, or it may consist of an optic device that can spread or focus the craser beam 170 further. Thus, once sufficient energy has built up through the multiple reflections and stimulated emissions, a coherent x-ray beam of one or more discrete monochromatic energies can be emitted from the window 150. Alternatively, if the craser device is formed into a partial ring, then the x-ray beam may not be as coherent as from a complete resonant ring, but its intensity still will be very high from the multiple reflections and stimulated emissions.

A power source 180 (FIG. 8) can be connected to the craser device 160 so as to produce power to the device to excite the gain medium. Alternatively, if the gain medium or media are radioactive, no power supplies are needed, as all necessary excitation is already internally present.

As noted previously, the source of excitation energy may be internal to the gain medium 120, or it can be an external source 104. It should be appreciated, and as illustrated in FIG. 1, the external excitation source 104 may excite simultaneously the gain medium and low index materials in the reflecting mirror 140 that fluoresce at the same or different energies than the gain medium 120, or the external excitation source may excite the emitting materials sequentially. The advantage of alternating between exciting the gain medium and fluorescing materials in the reflecting mirror 140 that emit at different energies than the gain medium atoms is for imaging techniques where it is desirable to image first with one energy and then with another, as in dual-energy healthcare imaging applications.

It should be appreciated further that a repeating structure of gain medium 120, transmission medium 130, and reflecting mirror 140 may be fabricated. For example, the craser device 100 of FIG. 1 may have two or more repeating structures of gain medium 120, transmission medium 130, and reflecting minor 140. By repeating structure is meant that the craser device 100 can have a repeating pattern of gain medium (gm) abutting transmission medium (tm) abutting reflecting minor (rm) such as in the form of gm/tm/rm/gm/tm/rm, and so on. Alternatively, the craser device may have an alternating pattern of gm/tm/gm/tm/rm and so on.

With specific attention to FIG. 3, a craser device 200 is partially illustrated in schematic form. The craser device 200 is similar to the craser device 100 in that includes a gain medium 120, a transmission medium 130, and a reflecting minor 140. However, the craser device 200 has a plurality of repeating structures of a gain medium 120 abutting a transmission medium 130 in the pattern gm/tm, and a single reflecting minor 140 capping off the repeating structures. While an external excitation source 104 is shown in FIG. 3, it should be appreciated that internal excitation sources, as previously described, may be utilized in the craser device 200.

With specific attention to FIG. 4, a craser device 300 is illustrated schematically. The craser device 300 is in a circular shape, with an external excitation source 104 housed within a radially inner chamber 155 that may be above the plane of the craser device. The inner chamber 155 may be a vacuum chamber, if the excitation beams include charged particles like electrons or protons, or a non-evacuated chamber if the excitation beam includes photons or non-charged particles like neutrons. Encompassing the chamber 155 is a gain medium 120, which abuts and is encompassed by a transmission medium 130, which itself abuts and is encompassed by a reflecting minor 140. The reflecting mirror 140 may take the form of a whispering gallery mode resonator and include multiple layers 140a-140n. The whispering gallery mode resonator 140 is configured to totally internally reflect electromagnetic waves at x-ray wavelengths.

Whispering gallery mode resonators are spherical or cylindrical structures that are configured to sustain high Q electromagnetic modes, which are electromagnetic waves that circulate and are strongly confined within the sphere or cylinder by total internal reflection. Whispering gallery mode resonators until now have been fabricated only at photon wavelengths longer than x rays.

Figure 9:
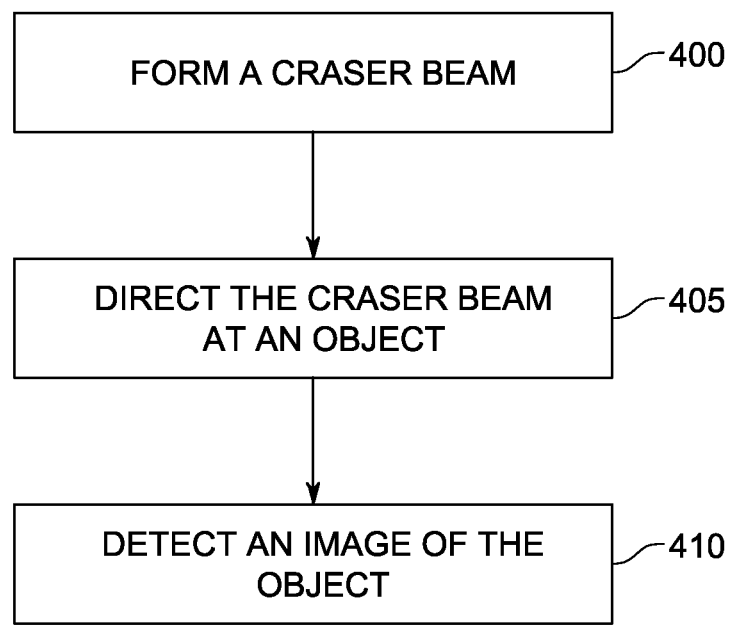
FIG. 9 illustrates process steps for imaging an object in accordance with an embodiment.

With specific reference to FIG. 9, and general reference to FIGS. 1-8, next will be described a method for imaging using a craser system like the craser system 160. At Step 400, a craser beam is formed. The craser beam may be formed through several sub-steps. The first sub-step may be to excite gain medium atoms found in a gain medium into excited states. Next, emitted photons are emitted from the excited gain medium atoms to a transmission medium. Then, some of those emitted photons are reflected by a reflecting mirror, which may be in the shape of a whispering gallery mode resonator, back to the transmission medium through total internal reflection. Finally, at least one of the emitted photons causes stimulated emission when the quantum confined photons interact with the excited gain medium atoms. Multiple or amplified stimulated emissions lead to the formation of the intense craser beam.

At Step 405, the craser beam is directed to an object. Finally, at Step 410, an image of the object is detected.

The craser system 160 can be used in a myriad of applications. For example, the craser system 160 can be used in medical imaging applications. Utilizing a craser system 160 that outputs a high-intensity monochromatic beam eliminates the disadvantage of most commercial medical imagers, which rely on Bremsstrahlung radiation, by providing x-rays at sufficient intensity to form clearer x-ray images in orders of magnitude less time without the unused attendant energies that can increase the risk of free radical damage leading to malignant tumor growth.

Further, the craser system 160 is capable of producing x rays at two, discrete and distinct energy levels. Thus, the craser system 160 improves over current multi-energy techniques by eliminating the confounding overlapping energies that are currently a problem in multi-energy imaging performed by using two different x-ray tube accelerating voltages.

Four-dimensional imaging is also improved through the use of the craser device 160. The device is configured to fit within a small space that can be, for example, a 10 centimeter by 10 centimeter by 10 centimeter (1000 cubic centimeters) space and can weigh up to three orders of magnitude less than current 4D x-ray sources. The reduced space and weight allows for at least an order of magnitude more rapid spinning of the x-ray source about the patient, thereby permitting stop-motion x-ray imaging with acceptable image quality between heart beats in excess of 100 beats per minute.

The craser system 160 also has applications outside of the medical field. For example, the craser system 160 can output such a high-intensity beam of x rays that cargo inspection are performed on every container, compared to the limited number that are performed today.

Also, the craser system 160 can be utilized for imaging printed circuit boards (PCBs), three dimensional computer chips, and industrial inspection imaging. Due to its significantly greater intensity, the craser system 160 can enable in-line inspection of PCBs, computer chips, and industrial parts, which is a marked improvement over the batch sampling done today.

In another application, the high beam intensity output of the craser system 160 enables x-ray imaging of subsea risers, thereby assisting in the prevention of oil spills that have destroyed large ecosystems and affected several of the world's bodies of water.

The craser system 160 can further be used for very long-range communications, for example into space. Its high energy and great intensity allow the system to communicate easily and directly with aircraft several miles above the earth's surface.

The power of the generator needed to accelerate the photon or particle beam that excites the gain medium of the craser system 160 can be as small as 100 watts. Thus, such a device is truly mobile and an improvement over current laser-based imagers requiring one gigawatt or more of power to create stimulated emission.

As noted previously, x-ray phase-contrast imaging creates images based on refractive index differences. This type of imaging relies on a spatially coherent x-ray beam, such as can be provided by the craser system 160, to traverse a sample containing regions of differing refractive indices and be refracted by these areas. Upon refraction, these x rays undergo a phase shift and lose their initial coherence. When these "incoherent" photons interact with un-refracted or direct x rays, constructive and destructive interference patterns are produced that are reconstructed into very high-contrast images of boundaries within the sample. A challenge inherent with phase contrast microscopy performed with standard laboratory x-ray sources is the large distances required for the x-ray beam coherence; a challenge that is completely eliminated with the craser system 160.

As noted previously, dark-field microscopy, like phase contrast imaging, requires a coherent incident x-ray beam, such as provided by the craser system 160. The major issue with dark-field microscopy is the long exposure times required due to the low intensity of laboratory (non-synchrotron based) x-ray sources currently available; the craser system 160 rectifies this issue.

As noted previously, x-ray holography depends on the wave-like properties of light and requires the use of x-ray lasers. The use of a craser system 160 enables x-ray holography to be accomplished in the laboratory and without the need for a synchrotron.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while embodiments have been described in terms that may initially connote singularity, it should be appreciated that multiple components may be utilized. Additionally, while various embodiments of the invention have been described, it is to be understood that aspects of the invention may include only some of the described embodiments. Accordingly, the invention is not to

What is claimed as new and desired to be protected by Letters Patent of the United States is:

1. A craser device, comprising:
   a gain medium with excited gain medium atoms that emit x-ray or gamma-ray photons;
   a transmission medium proximate to the gain medium, said transmission medium having a higher refractive index than the gain medium; and
   a reflecting mirror comprising one or more lower refractive index layers and abutting the transmission medium;
   wherein the x-ray or gamma-ray photons are confined to the transmission medium via total internal reflection, and wherein the x-ray or gamma-ray photons interact with the excited gain medium atoms through evanescent waves producing amplified stimulated emission, wherein the amplified stimulated emission forms a high intensity incoherent or coherent x-ray or gamma-ray beam.

2. The craser device of claim 1, wherein the gain medium is excited by a source of external excitation.

3. The craser device of claim 2, wherein the source of the external excitation is at least one of an electron beam, a proton beam, an ion beam, a neutron beam, and a photon beam.

4. The craser device of claim 3, wherein the electron beam is formed by one or more cold cathode field emitter devices.

5. The craser device of claim 3, wherein the electron beam, the proton beam, and the photon beam are formed by one or more radioactive elements.

6. The craser device of claim 2, wherein the source of external excitation comprises at least one of:
   a source transmitting first through the reflecting mirror; or
   a source transmitting first through the gain medium.

7. The craser device of claim 1, wherein the gain medium is formed of one or more radioactive elements.

8. The craser device of claim 1, wherein the gain medium is formed of one or more radioactive elements and one or more non-radioactive elements and is internally excited by the one or more radioactive elements.

9. The craser device of claim 1, wherein the gain medium is formed of one or more of the group consisting of molybdenum, tin, europium, gadolinium, erbium, ytterbium, osmium, tungsten, gold, cobalt, and uranium.

10. The craser device of claim 1, wherein the transmission medium is formed of a low Z material.

11. The craser device of claim 10, wherein the transmission medium is formed of boron, lithium, beryllium, or a polymer material.

12. The craser device of claim 1, wherein the excited gain medium atoms emit one or more of K-, L-, or M-fluorescent photons.

13. The craser device of claim 12, wherein the K-, L-, or M-fluorescent photons are reflected by the reflecting mirror through total internal reflection.

14. The craser device of claim 1, wherein the reflecting mirror comprises a whispering gallery mode resonator.

15. The craser device of claim 1, wherein the reflecting mirror comprises excited atoms that fluoresce at the same or different energies as the excited gain medium atoms.

16. The craser device of claim 1, comprising:
   one or more repeating structures comprising at least a gain medium and a transmission medium;
   wherein a second gain medium abuts the reflecting mirror on one side and a second transmission medium on another side, and a second reflecting mirror abuts the second transmission medium; or
   a second gain medium abuts the first transmission medium on one side and a second transmission medium on another side, and the reflecting mirror abuts the second transmission medium.

17. An imaging system, comprising:
   a craser emitting device, comprising:
      an internally excited or externally excited gain medium for forming x-ray or gamma-ray photons;
      a transmission medium proximate to the gain medium; and
      a reflecting mirror comprising one or more graded layers, said reflecting mirror having a lower refractive index than the transmission medium, the reflecting mirror configured to abut the transmission medium, wherein the x-ray photons interact within the transmission medium via total internal reflection and interact with a plurality of excited gain medium atoms providing amplified stimulated emission and formation of a high intensity incoherent or coherent x-ray or gamma-ray beam; and
   a detector for detecting images created with the high intensity incoherent or coherent x-ray or gamma-ray beam.

18. The imaging system of claim 17, wherein the craser emitting device is configured to operate at two or more non-overlapping energies.

19. The imaging system of claim 17, wherein the imaging system comprises one or more of a computed tomography machine, a laminography machine, a phase-contrast imaging machine, a holography machine, a dark field imaging machine, or an x-ray absorption imaging machine.

20. The imaging system of claim 17, wherein the gain medium is formed of one or more of the group consisting of molybdenum, tin, europium, gadolinium, erbium, ytterbium, osmium, tungsten, gold, cobalt, and uranium.

21. The imaging system of claim 17, wherein the gain medium is formed of one or more radioactive elements.

22. The imaging system of claim 17, wherein the gain medium is formed of one or more radioactive elements and one or more non-radioactive elements and is internally excited by the one or more radioactive elements.

23. The imaging system of claim 17, wherein the transmission medium is formed of a low Z material.

24. The imaging system of claim 23, wherein the transmission medium is formed of boron, lithium, beryllium, or a polymer material.

25. The imaging system of claim 17, wherein the excited gain medium atoms emit one or more of K-, L-, or M-fluorescent photons.

26. The imaging system of claim 17, wherein the reflecting mirror comprises a whispering gallery mode resonator.

27. The imaging system of claim 17, wherein the reflecting mirror comprises excited atoms that fluoresce at the same or different energies as the excited gain medium atoms.

28. The imaging system of claim 17, comprising:
   one or more repeating structures comprising at least a gain medium and a transmission medium;
   wherein a second gain medium abuts the reflecting mirror on one side and a second transmission medium on another side, and a second reflecting mirror abuts the second transmission medium; or
   a second gain medium abuts the transmission medium on one side and a second transmission medium on another side, and the reflecting mirror abuts the second transmission medium.

29. A method for imaging an object, comprising:
forming a craser beam by:
excitement of gain medium atoms in a gain medium into excited states;
emission of at least one x-ray or gamma-ray photon of at least one energy from the excited gain medium atoms to a transmission medium;
quantum confinement of the at least one photon of at least one energy to the transmission medium by total internal reflection from a reflecting mirror abutting the transmission medium; and
amplified stimulated emission of the at least one photon of at least one energy when the quantum confined photons interact with the excited gain medium atoms;
directing the craser beam at the object; and
detecting an image of the object.

30. The method of claim 29, wherein said forming a craser beam comprises forming a craser beam at two or more non-overlapping energies.

31. The method of claim 29, wherein said reflecting mirror comprises a plurality of layers that reflect photons, wherein a beam of such photons can have more than one energy 32. The method of claim 31, wherein said reflecting mirror comprises a whispering gallery mode resonating cavity capable of reflecting the beams of photons of more than one energy.

33. The method of claim 31, wherein the plurality of layers reflect 60 keV photons with a reflectivity greater than 99 percent.

34. The method of claim 31, wherein said quantum confinement comprises forming an evanescent wave portion of the photons emitted by the gain medium that re-enters the gain medium and interacts with the excited gain medium atoms multiple times to produce the amplified stimulated emission.

* * * * *